(12) United States Patent
Hellesøe et al.

(10) Patent No.: US 11,259,507 B2
(45) Date of Patent: Mar. 1, 2022

(54) ROOF COVER FOR FISH FARM

(71) Applicant: UNITECH Offshore AS, Blomsterdalen (NO)

(72) Inventors: Bernt Henrik Hellesøe, Bergen (NO); Gunnar William Birkeland, Haugesund (NO); Leiv Gunnar Wanvik, Nesøya (NO); Christine Ledergerber Hinderling, Zürich (CH); Issam Kabbani, Pully (CH)

(73) Assignee: Unitech Offshore AS, Blomsterdalen (NO)

( * ) Notice: Subject to any disclaimer, the term of this patent is extended or adjusted under 35 U.S.C. 154(b) by 0 days.

(21) Appl. No.: 16/879,750

(22) Filed: May 20, 2020

(65) Prior Publication Data

US 2020/0281168 A1    Sep. 10, 2020

Related U.S. Application Data

(63) Continuation of application No. PCT/NO2018/050286, filed on Nov. 21, 2018.

(30) Foreign Application Priority Data

Nov. 21, 2017   (NO) ................................ 20171878

(51) Int. Cl.
*A01K 61/60* (2017.01)
*H02S 10/40* (2014.01)
*A01K 61/10* (2017.01)

(52) U.S. Cl.
CPC .............. *A01K 61/60* (2017.01); *A01K 61/10* (2017.01); *H02S 10/40* (2014.12)

(58) Field of Classification Search
CPC ........ A01K 61/60; A01K 61/10; A01K 61/54; A01K 61/75; A01K 71/00; Y02A 40/826;
(Continued)

(56) References Cited

U.S. PATENT DOCUMENTS 2,410,246 A * 10/1946 Scrivener .................. E04C 3/32
52/148
3,717,124 A * 2/1973 Jacobs .................... A01K 61/60
119/223
(Continued)

FOREIGN PATENT DOCUMENTS

| CH | 699564 | A2 | 3/2010 |
| JP | S5442699 | U | 3/1979 |

(Continued)

OTHER PUBLICATIONS

H. Løvik, Satser på storskala flytende solceller, Teknisk Ukeblad, Nov. 4, 2017 [Obtained from internet Jan. 29, 2019] (http://www.tu.no/artikler/satser-pa-storskala-flytend-solceller/411295).
(Continued)

*Primary Examiner* — David J Parsley
*Assistant Examiner* — Jeffrey R Larsen
(74) *Attorney, Agent, or Firm* — Conley Rose, P.C.

(57) ABSTRACT

A roof cover for a fish farm, in which solar cells may be arranged on the roof cover to collect solar energy, and where the roof cover is resistant to weather conditions, and where the roof cover provides a controlled environment for fish farming by protecting it from wind and weather.

18 Claims, 6 Drawing Sheets

(58) Field of Classification Search
CPC .............. Y02A 40/81; C02F 2103/20; C02F 2103/007; C02F 3/06; C02F 1/004; C02F 2301/046; C02F 2303/24; C02F 3/322
USPC .......................................... 119/223, 226, 215
See application file for complete search history.

(56) References Cited

U.S. PATENT DOCUMENTS

| | | | | |
|---|---|---|---|---|
| 4,932,169 | A | * | 6/1990 | Charbonneau .......... E04H 15/20 52/2.18 |
| 5,444,943 | A | * | 8/1995 | Schelfhorst .............. E04B 7/14 52/192 |
| 5,617,813 | A | * | 4/1997 | Loverich ................ A01K 61/60 119/223 |
| 6,282,842 | B1 | * | 9/2001 | Simens ................... E04H 15/20 52/1 |
| 2006/0162667 | A1 | | 7/2006 | Papadoyianis et al. |
| 2015/0365046 | A1 | * | 12/2015 | Lerner .................... H02S 20/00 136/251 |
| 2019/0131919 | A1 | * | 5/2019 | Bjorneklett ............. F24S 10/17 |

FOREIGN PATENT DOCUMENTS

| | | |
|---|---|---|
| JP | S5752161 U | 3/1982 |
| NO | 851910 A | 11/1986 |
| NO | 338886 B1 | 10/2016 |
| NO | 20172017 A1 | 10/2017 |
| WO | 2004016079 A1 | 2/2004 |
| WO | 2016166041 A1 | 10/2016 |

OTHER PUBLICATIONS

C. Lura, Tru rflytande solceller kan bli milliardindustri, NRK Hordaland, Oct. 30, 2017. [Obtained from internet Jan. 29, 2019] https://www.nrk.no/hordaland/trur-flytande-solceller-kan-bli-milliardindustri-1.13756838.

Norwegian Search Report issued by the Norwegian Patent Office in relation to Norwegian Application 20171878 dated Apr. 19, 2018 (2 pages).

International Search Report issued by the Nordic Patent Institute acting as the International Searching Authority in relation to International Application No. PCT/NO2018/050286 dated Feb. 7, 2019 (4 pages).

Written Opinion of the International Searching Authority issued by the Nordic Patent Institute acting as the International Searching Authority in relation to International Application No. PCT/NO2018/050286 dated Feb. 7, 2019 (7 pages).

International Preliminary Report on Patentability issued by the Nordic Patent Institute acting as the International Preliminary Examining Authority in relation to International Application No. PCT/NO2018/050286 dated Feb. 11, 2020 (27 pages).

European Patent Application No. 18880447.0 extended European search report dated Jul. 21, 2021 (8 pages).

Chilean Patent Application No. 1319-2020 Office Action dated Aug. 6, 2021 (10 pages).

* cited by examiner

ROOF COVER FOR FISH FARM

CROSS-REFERENCE TO RELATED APPLICATIONS

This application is a continuation of PCT International Application No. PCTNO2018/050286 filed Nov. 21. 2018, which claims priority to Norwegian Patent Application No. 20171878, filed Nov. 21. 2017, the disclosure of each of these applications is expressly incorporated herein by reference in their entirety.

FIELD OF THE INVENTION

The invention relates to a roof cover for a fish farm, where solar cells may be arranged on the roof cover to harvest solar energy, and where the roof cover is resistant to weather conditions, and where the roof cover creates a controlled environment for fish farming by protecting it from wind and weather.

BACKGROUND OF THE INVENTION

Predictable and environmentally sustainable growth in Norwegian salmon- and trout farming is dependent on new areas being utilized in the outer coastal zone. This requires rethinking, robust and smart solutions. Sustainable also means that the growth in production cost per kg of produced salmon must be reduced or, to a greater extent, reversed.

The vast majority of fish farms in Norway are located inshore sheltered from waves, wind and currents. Fish farms today face several challenges in the fjords where they are located. Some of them are pollution of the seabed and salmon lice. These problems may be solved by moving the fish farms out to exposed sea areas with greater wave height, water depth and currents. The weather conditions in these sea areas are rough and one is therefore dependent on a structure that can handle such weather conditions. The operation of the facility is also dependent on energy. Such energy may be supplied via service vessels. Such vessels that operate in the fjords are not suitable for operation offshore due to waves and wind. There is thus a need for an energy source that can supply such facilities with energy over long periods in harsh weather conditions.

WO 2004/016079 A1 and US 2006/0162667 A1 describe floating fish farms. WO 2016/166041 A1 describes a floating solar-harvesting platform where the solar cells are arranged on a roof cover.

One of the challenges of operating in exposed waters is access to energy. Shore power may be costly and technically challenging to lay out and diesel units are not future-oriented.

Due to high energy consumption in fish farming, there is a need for renewable energy. A roof cover for the fish farm can provide support for mounting solar cells that can collect solar energy. In Nordic countries, or countries with similar temperature conditions, such solar cells are particularly suitable because of low operating temperature and much reflected light from the sea.

The development in solar cell technology is gradoublely approaching increasingly flexible, lighter and thinner solar cells, while efficiency increases and cost decreases. Consequently, it will be increasingly beneficial to apply solar cells on the top of fish farms.

The invention relates to one or more floating fish farms which can themselves harvest energy, and which is designed for aquaculture in exposed coastal zones which can contribute significantly to increased and improved utilization of space along with future-oriented and profitable production of salmon and energy in areas with strong wind and tall waves.

SUMMARY OF THE INVENTION

The invention relates to an aquaculture facility, mainly a fish farm, also referred to as a net cage or a facility. The invention also relates to one or more such fish farms connected to or close to each other. Such a fish farm may comprise one or more facilities, e.g. 6 facilities. The facilities include a net and typically have a circumference of approx. 200 meters. Each facility includes a main supporting structure in the form of a float ring. The float ring may accommodate all systems and provisions necessary for efficient and proper farming of salmon, including personnel, feeding systems and silos. Therefore, a feeding vessel is not necessary and the facility thus becomes one independent unit. The fish farm is adapted for harvesting of solar energy and allows for the establishment of an energy system for renewable energy in the outer coastal zone.

The fish farm is suitable for harsh weather conditions and includes a renewable energy system. The energy system can also be used on existing facilities, supply energy to one or more facilities or supply energy for other purposes.

The main structure of the aquaculture facility forms a ring shaped structure with a circular cross section of polyethylene (PE) with an internal diameter between 2 and 6 meters, mainly 3 meters, and especially 3.6 meters, where the structure may have a circular circumference from 180 to 220 meters. The main structure may be extruded into a continuous structure, or into several parts joined together. Various elements of extruded profiles, including elastic elements, are suitable for large PE bodies in high seas. The main structure may be equipped with sensors to monitor stress and deformations. Extruded structures may be optimized with regard to strength, flexibility and rigidity and thus be adapted to the various sea conditions and very rough sea.

The main structure provides shelter and room for crew, technical equipment, complete feeding system with silos and all necessary provisions. The main structure also makes it possible to carry an air-filled membrane or canvas structure with solar cells. The overlying membrane, which is extended with a skirt of 6 to 8 m depth, partially protects the fish farm from salmon lice in the upper water layers.

The energy system may include one or more of the following: solar cells, a remotely located solar cell facility, cables, batteries and control systems. The energy system can produce energy, including electricity, and store the electricity in batteries located on the facility or near the facility.

Depending on the size of the energy system, the aquaculture facility may have a significant excess of energy which may be used for the production of brackish water. The fish farm can also harvest energy from one or more wind turbines and/or one or more wave power facilities. These energy sources can produce compressed air that can operate both membrane filtration for low-salt water production, drive the feeding system without the use of pumps or compressors, and charge electric support vessels.

Exposed coastal areas are well-suited for harvesting nature's energy and forces, and the facility takes advantage of this primarily by producing electricity from solar energy, but also with the intention of harnessing wind and wave forces for production of both electricity and direct compressed air. The facility may be self-sufficient with energy and deliver excess energy to boats and other vessels that may be charged by a custom charging station/buoy.

The energy storage on the facility is planned as battery packs installed inside the main structure. Additionally, a battery container may be provided which may be stored on the seabed. The energy stored in these battery packs can supply energy both for the operation of the fish farm itself and for electric marine vessels via the charging station.

An alternative to the battery packs in the fish farms is to have a large battery container on a raft associated with the facility. In addition to the batteries, parts of the energy can also be stored as compressed air, so that it can be used in various operating processes, e.g. feeding and brackish water production.

A floating structure/barge may be used for the facility. This floating structure may be covered with solar cells on the upper side and it may be equipped with sensors to measure potential energy production using a linear wave power generator associated with the floating structure/barge.

A wave power generator can operate in connection with the facility. It is possible to install a waveguide to intensify the waves in a given area towards a wave power facility. An artificial waveguide can also be installed.

The wave power facility may function as follows: A buoy on the surface moves up and down with the waves. A steel wire is attached to the underside of the buoy at one end and to a linear generator at the other end. The generator is attached to a base on the seabed. The steel wire carries the buoy's movement to a translator in the electric generator, thus producing electrical energy. The generators produce an electric current of varying frequency and amplitude. Therefore, an underwater converter may be installed that converts the produced power to the standard $50/60$ Hz AC power that may be used to power the facility. A facility can accommodate one or more generators, depending on the needs of the receiver and the capabilities of the location.

The facilities include a roof cover with solar cells. The solar cells may be melted/plastic welded/welded to the underlay. They do not need metal fasteners that are susceptible to damage by corrosion. The solar cells do not penetrate the underlay and thus the underlay remains completely waterproof, which is important in relation to lice problems. The solar cells are mainly of low weight compared to ordinary solar cells. The solar cells may also have snow melting capability. The top layer of reinforced glass is very resistant to wind and weather, including hail, but the solar cells are still very flexible, which is important when placed on a moving object such as this facility. The solar cells may be produced in irregular shapes, so that even more of the pie-shaped areas of the facilities may be utilized.

Energy storage is installed in the form of battery packs in the fish farm. The planned battery solution includes a battery pack integrated into the main structure of all the facilities. These may be placed inside the PE tube which encircles the fish farms, where inverters, control systems, feeding equipment, etc. will also be placed. As an alternative to the battery packs in the fish farms, a larger battery container can be installed on a raft attached to the fish farm. In addition to this, a battery container may be placed on the seabed in the long term, which will serve as a charging station for AUVs (Autonomous Underwater Vehicles). Battery packs may be supplied which may be integrated in the PE tubes, a container for storage on the seabed and a container for storage on a raft.

In addition to batteries, a significant part of the energy from wind turbine and wave power facilities may be stored in the form of compressed air which can produce low-salt water. In the long term, it may be possible to replace air compressors and pumps completely with compressed air from self-supplied energy production without having to go about producing electricity.

Fresh water and brackish water are important measures against parasites. The facility is adapted for considerable energy production, which makes it possible to produce large amounts of low-salt water on the facility. From such energy facilities, compressed air may be stored which may be used to press the brine through membranes to produce low-salt water, for example 5-15 ppm low-salt water. This water may be over-saturated with oxygen and provide an oxygen-rich brackish water layer in the upper part of the facility, which can contribute to a more hostile environment for the lice. The facility can also include self-developed lice traps up and downstream of the facility.

In the outer and exposed coastal zone, where the wave height may be 4-8 m, there is a large number of unused sites with significantly better water exchange than what is often the case inside the fjords. Overall, the load will increase in exposed coastal zones, but this will still be a desired development as long as one chooses sites that give minimal local load. The facility can lie in the transition between fjord and sea.

The main structure can accommodate feeding systems that cause the feeding raft to become redundant, instead including its function within the main structure. The facility is adapted so that a service boat can be moored to the facility. The service boat may be a plug-in hybrid electric boat that may be charged from the facility and also by land based electricity when in port.

Waveguides may be used to divert the waves away from the facilities and/or to concentrate the waves into a wave power plant.

Wind turbines may be used as part of or in connection with the facility.

The facility may include equipment such as feeding systems, net cages for dead fish, control systems, lighting above and below water, environment and camera surveillance and more. A lice trap may be included upstream and downstream of the facility.

The facility is designed without a feed raft, but with a feeding system in the main structure. The facility can provide solutions for farming up to 8 m Hs, and if possible 10 m Hs.

A waveguide may be used to reduce the sea load on the facility and at the same time increase the amount of energy supplied to the wave power facility. Large lenses under the sea surface or on the bottom may be designed so that the wave front may be steered away from the facilities and towards a wave power plant and increase the effect on the latter by up to 50%. The main structure can withstand high seas and provide shelter for fish farmers as well as ensuring that the fish are healthy, but it can also provide the necessary carrying capacity to carry a membrane that functions as a roof and as an underlay for solar cells.

The main structure is designed with space for ballast, floating elements, ventilation and sections for all necessary technical equipment. There are also planned simpler circular profiles in which the walkway is located inside.

The choice of material is mainly extruded Polyethylene (PE), preferably High Density Poly Ethylene (HDPE). The material is very strong and ductile in the elastic regimen and has the ability to return to its original shape after significant deformation. The Young's modulus and shear modulus are approx. $1/400$ of steel, and because of this feature (low resistance to deformation) it can withstand and adapt to the forces of waves, wind and current as this results in small stress variations even though large deformations may be observed with the naked eye.

The fish farm is basically an independent unit and self-sufficient in energy and everything one needs to run efficient, sustainable and safe fish farming, but can also be supplied with energy from external sources.

The fish farm includes a roof cover. The roof cover helps to provide an area for solar cells, and contributes to provide an improved indoor working environment for operators. It also contributes to a more efficient feeding with dispersion without wind. In addition, it has aerodynamic properties. The roof cover, like the entire structure, is designed to collapse in a controlled manner in the event that waves washes over the roof cover. The roof cover is extremely compliant at the same time as it can withstand regular stress and strain limits. The roof cover can rise back to its normal position when the water is drained through peripheral slots and openings between roof segments.

The roof cover also allows for a controlled environment for fish farming, where, for example, lighting in the ceiling may be used to accelerate the daily frequency and growth of fish. The roof cover provides a better working environment as, together with the float ring, it creates an environment protected from precipitation, waves, wind and sea spray.

The roof cover and its integrity comes from, among other things, the acting cargo-carrying wire grid (suspension bridge principle), and air beams (air beams in the form of pressurized pillows mounted on the above-mentioned wire grid).

A support point has been introduced in the center of the facility. This makes it possible to reduce the arch height of the cable grid as well as reduce the volume and silhouette of the air beams, all in favor of a low wind profile as well as the flatness with regard to the efficiency of the solar panel system.

This support point is located on a floating element that floats in the sea surface. The floating element is attached to a mast that holds the roof cover up. The floating element has freedom of movement in the heave axis to reduce tension on the roof cover if water washes over the roof cover. The mast and the floating element are supported by the float ring via radially positioned rigid or non-rigid spokes or lines, including metal rods, ropes, wire, chain or the like, to avoid movement in the horizontal plane.

The floating element exerts little resistance to being pushed down into the sea (small water area-constant force). When the water is drained off, the float will, assisted by the from the spokes/lines that connect it with the float ring to help the roof cover rise in a controlled manner.

Frost and ice formed from spray or atmospheric mist may be combated by "turning" the energy from batteries back into solar cells, which will then melt frost and ice. Load from cable grid and canvas is relatively small in comparison.

The roof structure that carries the solar cells is dimensioned for 30 metres per second H10 wind speed.

Wind may be a challenge with regard to dynamic effects. The roof cover therefore has a circular opening of approx. 5-15 m diameter in the top and slits of approx. 10-30 cm in all junctions. This is also important with regard to "air pumping" when large waves pass through the fish farm interior, which could have contributed to fatigue over time. The opening therefore acts as a valve that normalizes the air pressure below the roof cover relative to the ambient air pressure.

The fish farm may have the following characteristics:

The float ring is easily deformable at a level far from floating steel-based fish farms.

PE as the main material in the float ring (Young's Modulus 1/400 part of steel)

Synthetic membrane canvases in the roof cover with highly deformable and minimal hysteresis loss during stretching.

Multi modal collapse mechanisms and recovery without permanent damage or fatigue on canvas and solar cells Coherent stiffness in all elements of the collapse chain that prevents tearing including connection to central floating element No metallic components in the solar cells that would increase the risk of tearing due to "step up" of stiffness No sharp corners and geometry on the solar cells that can lead to tension in the membrane and attachments Fresh water and brackish water have become an effective tool for lice treatment. As the roof cover represents a considerable area, this may be used to collect rainwater and store it in tanks (double bottom).

6 facilities will offer a significant rain-exposed area to collect fresh water and may be used to make brackish water.

The facility may also contain a production facility for low-salt water as an important tool against lice, driven by compressed air generated from wind turbine or wave turbine energy or by solar electricity.

The cross-section of the float ring may have a diameter of 3.6 meters and is highly suitable for supporting a yarn, and may also contain all the technical equipment necessary inside the tube. Tanks for fish food and other equipment can also be easily installed inside a large diameter tube. Large diameter tubes or profiles may be extruded in sizes ranging from 350 mm to 5000 mm in diameter.

DETAILED DESCRIPTION OF THE FIGURES

Figure 1:
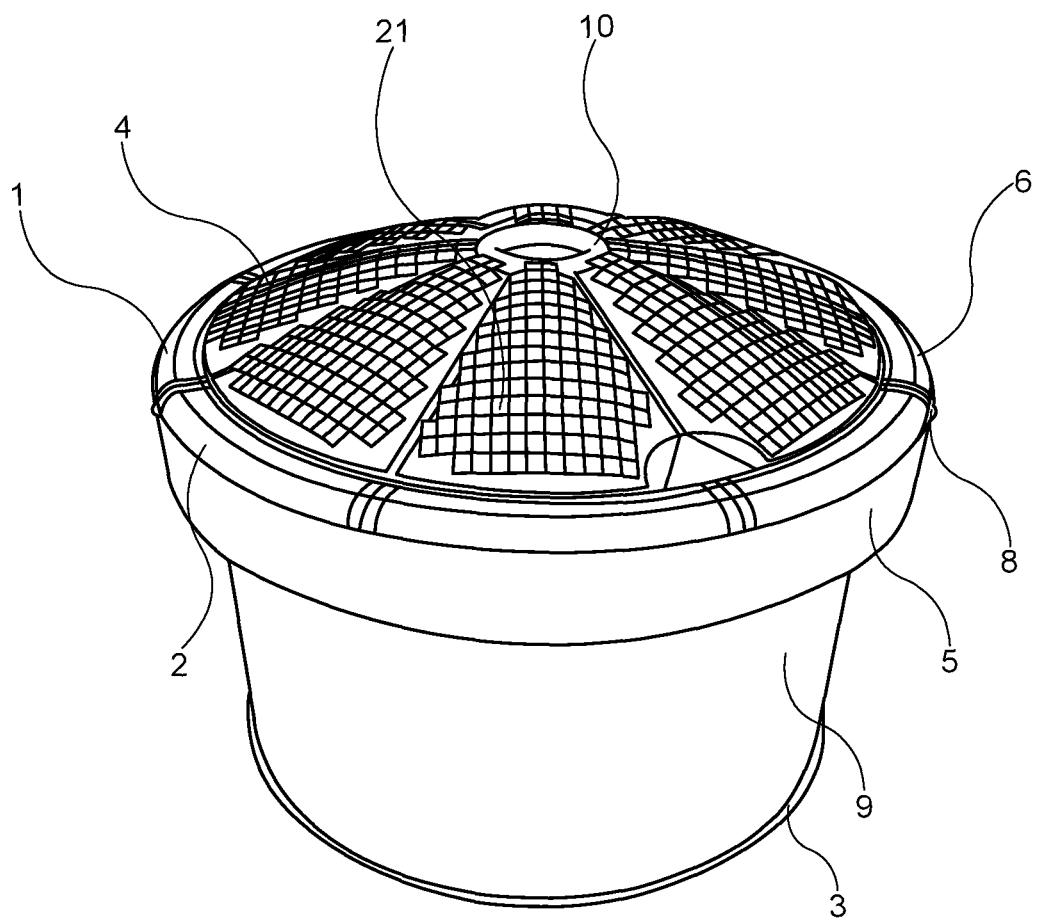
FIG. 1 shows the fish farm in its entirety.

FIG. 1 shows a fish farm 1 including net cage and with a surrounding float ring 2 comprising a roof cover 4, where the roof cover 4 is divided into several sector segments 21, and which comprises a supporting ring 10. FIG. 1 also shows a ballast ring 3 at the bottom of net 9, and mooring fastening points 8. A lice skirt 5 which is impervious to salmon lice and possibly other parasites is attached along the outer edge of the float ring 2. The roof cover 4 may consist of several sector segments 21 separated radially from the center of the float ring, which is joined together with fastening means, and which together form an enclosing roof. When referring to the roof cover, it is referred to all sector segments. The roof cover 4 can also be referred to as a canvas. The roof cover is held up by a mast (not shown in FIG. 1).

The roof cover 4 is designed to collapse if subject to forces by water washing over it, and is designed to rise up by itself. The roof cover 4 may have a slope that optimizes the efficiency of the solar cells 19 by capturing as much sunlight as possible, but at the same time having such a slope that the roof cover 4 becomes self-draining for rainfall and sea spray. If the roof cover 4 collapses or becomes deformed as a result of loading, an overpressure is formed under the roof cover. Air will then leak out of the slips formed between the sector segments, the ventilation opening formed within the support ring 10 and the gaps between the float ring 2 and the sector segments 21.

The roof cover 4 may consist of membrane/membrane-like material, but can also consist of polymer, oil-based material, PVC, or other water-resistant/waterproof/water-repellent/water-diverting material. The roof cover 4 is also referred to as a membrane, but this is not limited to the material itself. Membrane can also be understood as a physical extent of membrane material.

Figure 2:
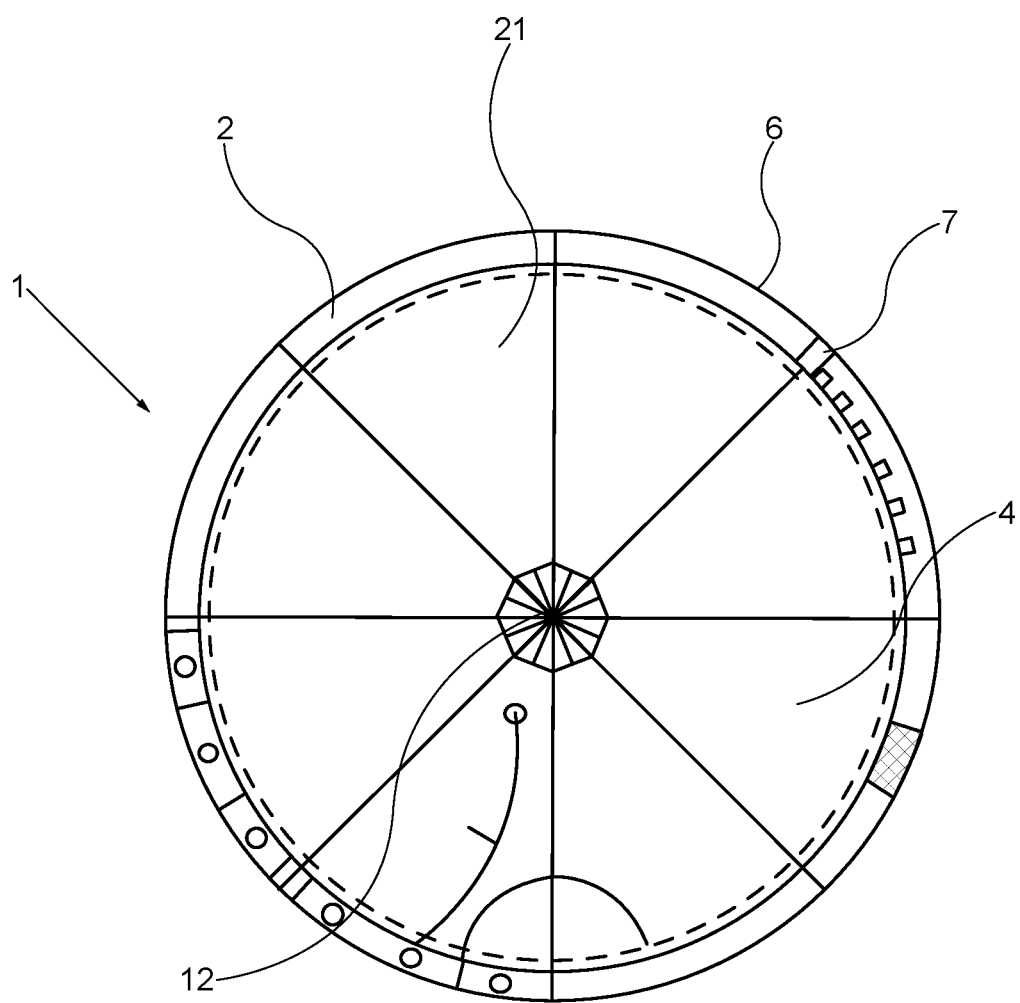
FIG. 2 shows the fish farm from above.

FIG. 2 shows the fish farm 1 from above. FIG. 2 further shows the float ring 2, the roof cover 4 divided into sector segments 21, a mast 12, a joint piece 7 joining together arched elements 6. The number of joint pieces 7, which depends on the number of arched elements 6, may vary.

Figure 3:
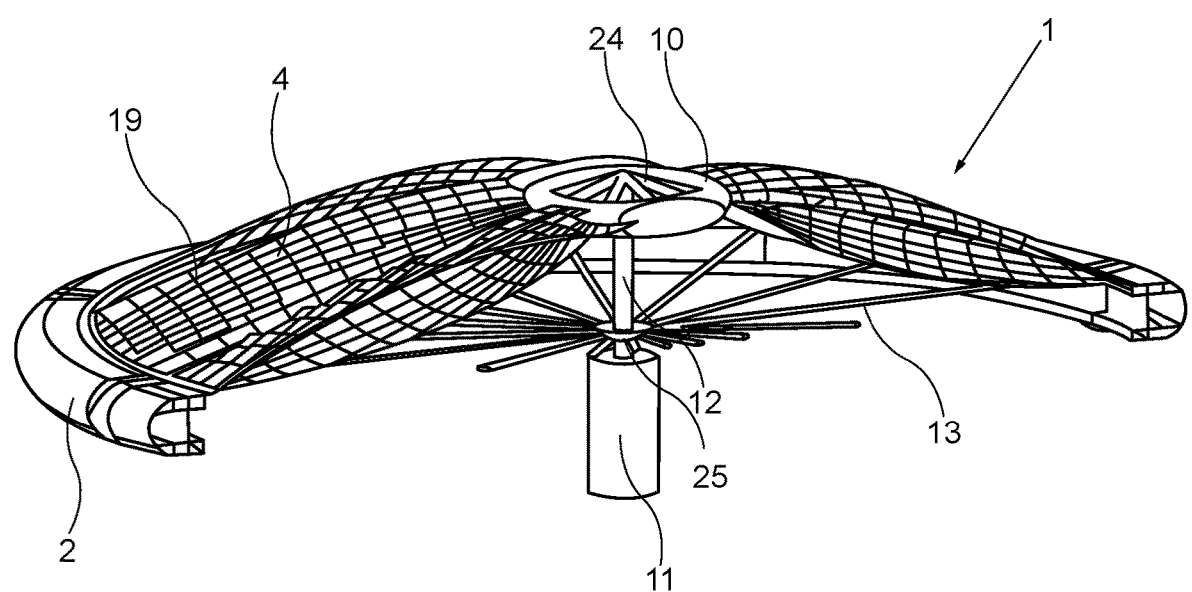
FIG. 3 shows a cross-section of the fish farm and in particular the roof cover.

FIG. 3 shows the fish farm 1 with a float ring 2 and a roof cover 4, where the roof cover 4 is attached to the float ring 2 and to a support ring 10 which is secured with upper support means 24, which may be rigid or non-rigid lines, spokes, metal rods, wire, chain, rope etc., to a mast 12 for holding up the support ring 10 and thereby also the roof cover 4. The mast 12 is fixed to the upper surface of the floating element 11, the floating element and mast being stabilized in the horizontal plane by lower support means 13, which may be rigid or non-rigid lines, spokes, metal rods, wire, chain, rope, etc., extending radially between the mast 12 and the float ring 2. The lower support means 13 are connected to the mast via an annular body 25 which encircles the mast 12, but which is not fixed to the mast 12. The mast 12 thus extends vertically through the annular body 25 and has vertical freedom of movement through it. The roof cover 4 constitutes a superstructure attached to the float ring 2 and held up by the mast 12 arranged on the floating element 11 which is located in the middle of the float ring 2. In addition, FIG. 3 shows solar cells 19 arranged on the roof cover 4.

The mast 12 projects higher than the height of the float ring 2 over the sea. The mast 12 and the floating element 11 are also stabilized by upper support means 24 attached to the top of the mast 12 and extending radially between the mast 12 and the support ring 10. The roof cover 4 is indirectly attached to the upper part of the mast 12, and so that the roof cover 4 achieves a slope from the mast and down to the float ring 2.

The roof cover must be secured in relation to high wind speeds so that overpressure is evacuated from the underside of the roof cover, inside the facility. This is solved by means of a central opening formed by the support ring 10 in the middle of the roof cover, and by the fact that the roof cover is made up of sector segments 21 with a slip between them where each sector segment 21 is attached to adjacent sector segments, and in the periphery towards to the float ring.

The solar cells 19 may be solar cell elements or solar cell panels. The solar cells may be deformable and rigid. They may be attached to the roof cover 4 with e.g. with adhesives/adhesives, they may be melted/plastic welded to the roof cover 4 or attached to the roof cover 4 indirectly via seams, or secured to the roof cover by lying sown in pockets.

Figure 4:
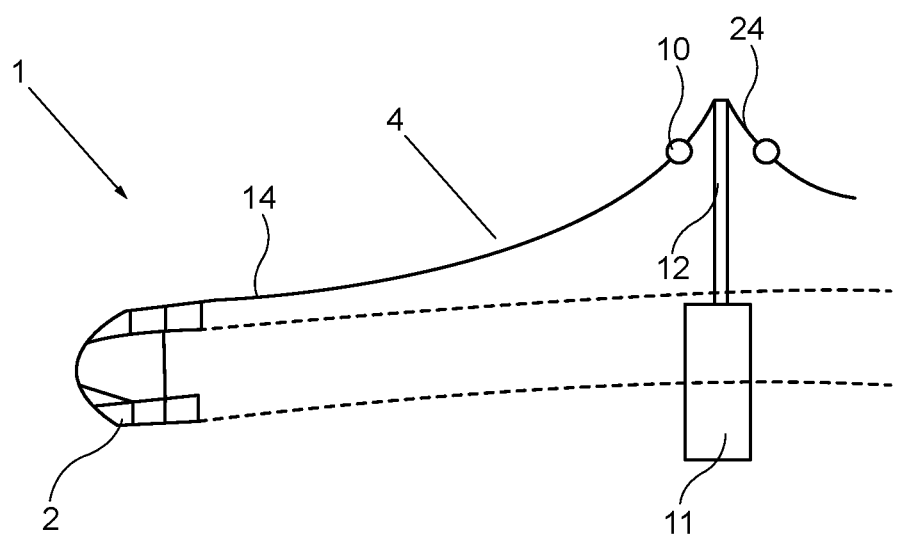
FIG. 4 shows a cross section of the fish farm, and an embodiment in which the roof cover consists of a single membrane.

FIG. 4 shows a cross section of the fish farm, and an embodiment in which the roof cover 4 consists of a single membrane 14. FIG. 4 further shows floating elements 11, and the mast 12 which is attached to the top of the floating element 11. FIG. 4 further shows a cross section of the support ring 10, and the upper support means 24 connecting the support ring 10 to the mast. In this embodiment, the roof cover 4 consists of a single membrane which is attached/supported to/by the float ring 2 at one end, and attached/supported to/by the mast 12 in the other. More specifically, the membrane 14 is indirectly attached/supported to/by the mast 12 via a support ring 10 which is attached/supported to/by the mast 12 via upper support means 24.

Figure 5:
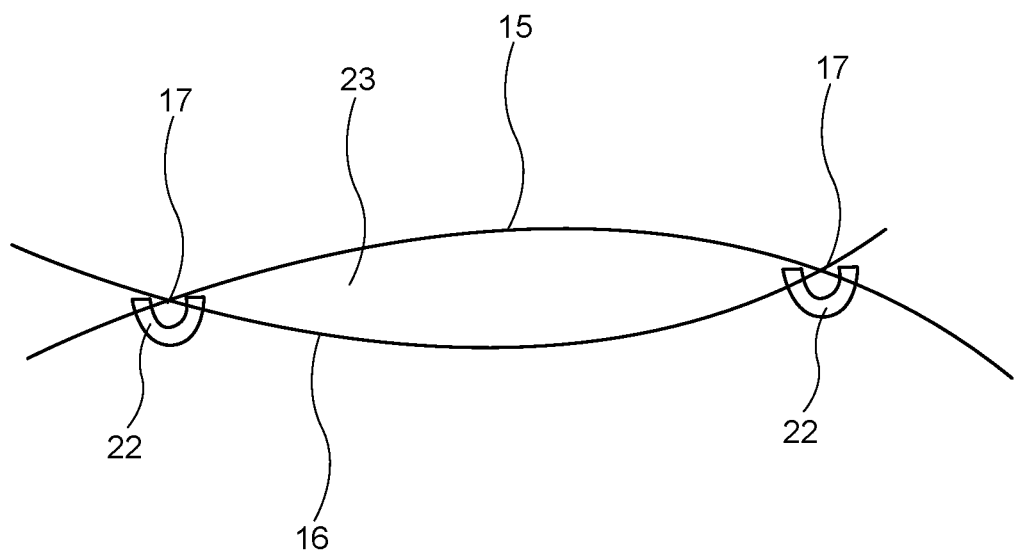
FIG. 5 shows a cross-section of an embodiment in which the roof cover consists of a double membrane and an embodiment in which the roof cover includes drainage channels.

FIG. 5 shows an embodiment in which the roof cover 4 consists of a double membrane. FIG. 5 shows a cross-section of a sector segment 21 with an upper membrane 15 and a lower membrane 16, and an air space 23 formed between the upper and lower membranes. FIG. 5 also illustrates an embodiment in which drainage channels 22 with curved cross sections are used and arranged on the underside of the joining means 17 between the sector segments 21. Such drainage channels 22 may be used in all embodiments. The drainage channels 22 may consist of material such as polymer, oil-based material, PVC, or other water-resistant/waterproof/water-repellent/water-diverting material. The drainage channels 22 are preferably elastic but may also be rigid.

In the embodiment of FIG. 5, the roof cover 4 consists of several sector elements 21 each having a double membrane, i.e. two canvases consisting of membrane material on top of each other, comprising an upper 15 and a lower membrane 16, which are joined together along the periphery of the sector segments 21, and which forms an inflatable air space between the upper 15 and lower membrane 16. Air may leak out of the junctions between upper membrane 15 and lower membrane 16 if the joining means 17 are not completely airtight. The upper membrane 15 and the lower membrane 16 may also be joined together to form a fully airtight pocket.

Air supply may be provided from compressors/fans located within the float ring and continuously supplying air into the air space between the membranes, creating overpressure, to maintain the sector segment 21 in inflated condition. The upper membrane will thus have a curved shape, so that precipitation and sea spray will flow down towards the joining means on the side and down towards the float ring 2.

The roof cover 4 may have a drainage system which collects water from the roof cover 4, such as rainwater or salt water from waves, and which leads this water to storage tanks. This water/brackish water may be used to the treatment of salmon lice. The drainage system may include drainage channels 22 arranged radially between the sector segments, and on the underside of the joining means 17 of the sector segments 21, so that water will drain off the sector segments 21 through the slip between the sector segments 21 and into the drainage channels 22 and into storage tanks 22. The storage tanks may be located inside the float ring 2.

If seawater washes over the float ring 2 and the aforementioned drainage system fails to remove this seawater, the roof cover 4 can, in a controlled manner, collapse and partially settle into the sea bounded by the float ring 2. If the roof cover 4 or parts of the roof cover ends up in the sea, or a double membrane sector segment 21 is drained of air as a result of loading, it may rise/recover its original shape by means of a built-in mechanism.

This may be solved by:
- refilling/blowing air into a sector segment 21 with double membrane until the structure has reached its original shape after disruptive loads have subsided
- a built-in mechanism that responds with a soft reaction from the centrally located floating element 11 which holds the roof cover upright, with little water area, which moves along with the roof cover depression until disturbing loads disappear, or where the mast 12 may be elastically deformed and restored either by reduced material rigidity or mechanical suspension or damping
- the mast 12 being compressible in the longitudinal axis, the mast comprising a damping piston
- the floating element 11 and the mast 12 being able to submerge and resurface
- a combination of refilling/filling air into a double membrane sector segment 21 and soft reaction from the centrally located floating element The double membrane sector segments 21 may be provided with a valve such that if the sector segments 21 are compressed as a result of loading, the valve will vent air to prevent the air pressure from tearing the membrane/roof cover 4 or its joining means. The air space 23 between the membranes have achieve an air pressure giving the membranes the shape of an air cushion/a bubble. This will have a stiffening effect, and the sector segments 21 will thus not be equally dependent on the tension between the mast and the float ring 2 to maintain such a shape that causes precipitation and spray to drain/divert from the sector segment 21, and thus to prevent water from accumulating on the roof cover 4. The inflated sector segment 21 with double membrane will act as an air beam that can take up pressure and tension forces.

The sector segments 21 are secured to each other by joining means 17, these joining means 17 forming joints such as e.g. a rope-line seam through holes (not shown) in each adjacent edge of the sector segments 21. These joining means 17 will form a slip between the sector segments. The sector segments 21 are also attached to the float ring by means of joining means 18. The sector segments 21 thereby form a completely enclosing/continuous superstructure.

Figure 6:
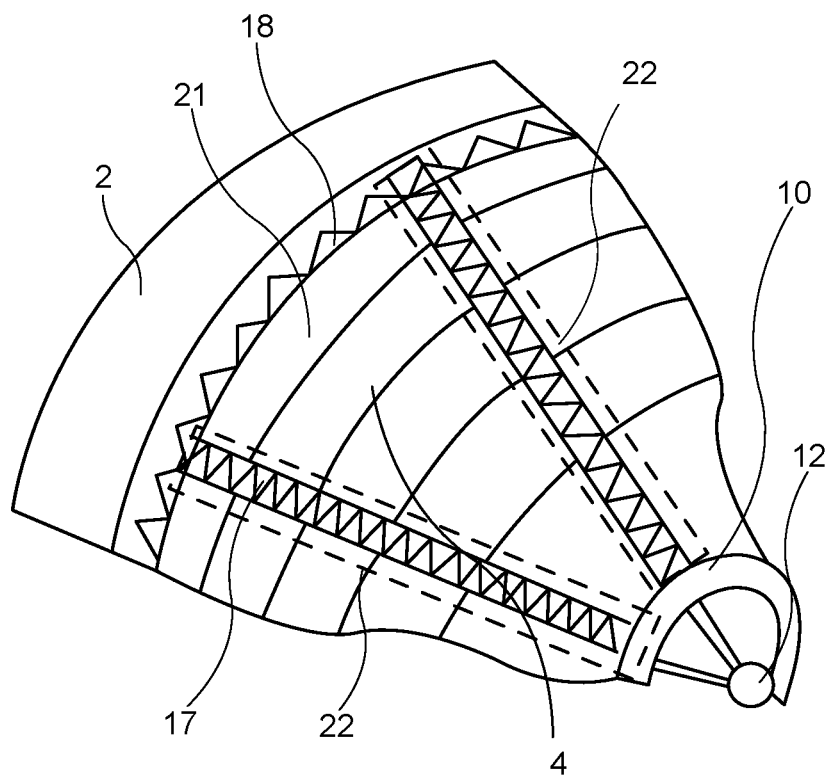
FIG. 6 shows the fish farm from above, and an embodiment in which the roof cover consists of double membrane, and an embodiment in which the roof cover includes drainage channels.

FIG. 6 shows a sector element 21 from above. FIG. 6 shows the float ring 2, the joint between the sector segments 21 and the joining means 17 between the sector segments and the float ring 18. The periphery of the sector segments 21 may be reinforced with several layers and/or with PVC. The roof cover 4 is tightened so that it achieves a stretch so that rainfall and sea spray is drained from the membrane/runs away from the membrane, so that the water does not collect and remain on the membrane.

The roof cover 4 may also consist of a combination of single canvas and double membrane. This mode of execution is not depicted. In this case, there is provided a hammock consisting of a single canvas of rope, e.g. a rope based net. This rope based net can carry a double-membrane roof cover. This will reduce the tightening need for the single membrane system by tolerating sagging/slackening.

Figure 7:
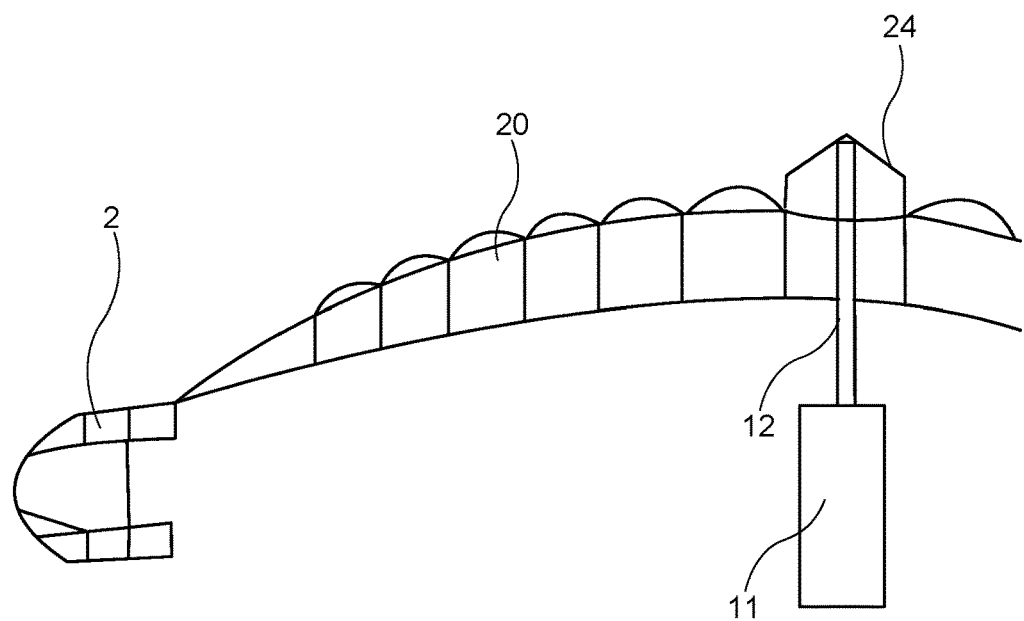
FIG. 7 shows a cross section of the roof cover in an embodiment having "air beams".

FIG. 7 shows a cross-section of the roof cover 4 in an embodiment in which the sector segments 21 are divided into several tubular elements 20. The tubular elements may be directed radially out of the center of the facility, or be arranged in parallel to the float ring in curved shape.

Figure 8:
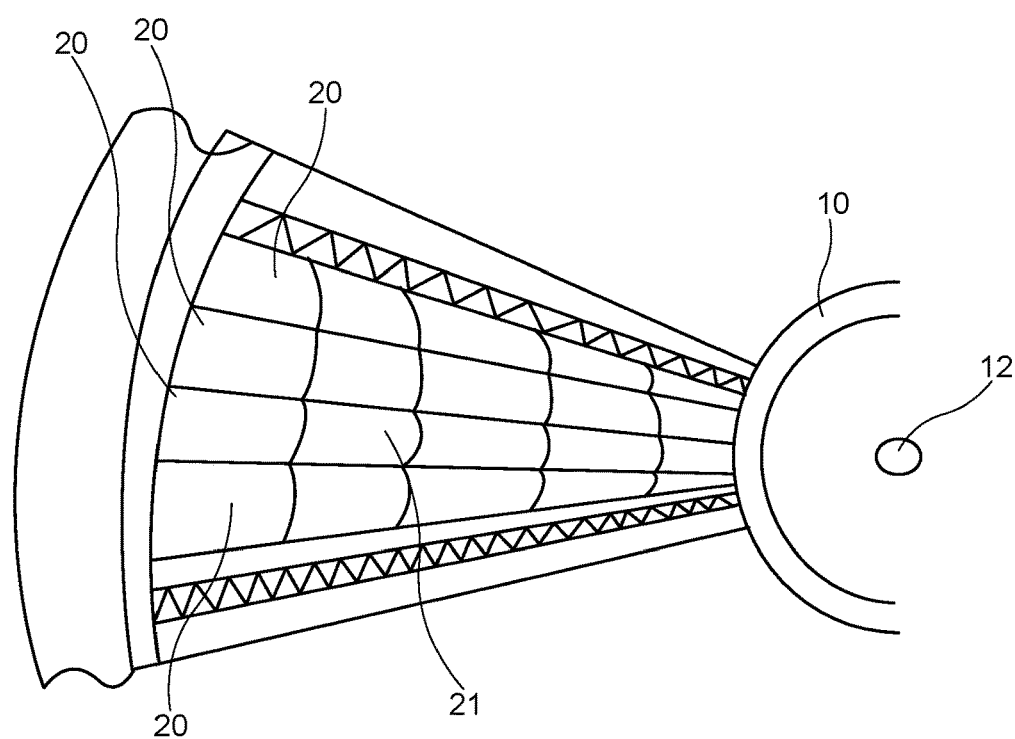
FIG. 8 shows a sector segment of the roof cover from above in an embodiment with "air beams".

FIG. 8 shows an embodiment, seen from above, in which the sector segments 21 consist of double membranes joined together in a radial direction to form more tubular elements 20 which act as "air beams".

| | |
|---|---|
| 1 | Fish farm |
| 2 | Float ring |
| 3 | Ballast ring |
| 4 | Roof cover |
| 5 | Lice skirt |
| 6 | Arched element |
| 7 | Joint piece |
| 8 | Mooring fastening point |
| 9 | Net |
| 10 | Support ring |
| 11 | Floating element |
| 12 | Mast |
| 13 | Lower support means |
| 14 | Membrane |
| 15 | Upper membrane |
| 16 | Lower membrane |
| 17 | Joining means |
| 18 | Joining means between the sector segments and the float ring |
| 19 | Solar cells |
| 20 | Tubular elements |
| 21 | Sector segments |
| 22 | Drainage channels |
| 23 | Air space |
| 24 | Upper support means |
| 25 | Annular body |

The invention claimed is:

1. A roof cover for a fish farm, the fish farm comprising a float ring and a net cage fixed to the float ring, wherein:
the roof cover is attached to the float ring;
the roof cover is supported by a mast arranged on a floating element located in a middle of the float ring;
solar cells are arranged on the roof cover;
the roof cover being divided into several sector segments separated radially from a center axis of the float ring, the sector segments being joined together with joining means, the sector segments together forming an enclosing roof, and the sector segments form slits between each other and between the sector segments and the float ring, and wherein each sector segment has a double membrane comprising an upper and a lower membrane, the membranes of each sector segment being joined together along a periphery of the sector segments, and the membranes of each sector segment forming an inflatable air space between the membranes, wherein the roof cover further includes a support ring which provides an opening in the roof cover between the roof cover and an upper part of the mast that is configured to allow air flow therethrough to normalize air pressure below the roof cover relative to ambient pressure above the roof cover.

2. The roof cover according to claim 1, wherein the roof cover is adapted to yield or collapse due to external fluid loading and further adapted to automatically rise after the fluid loading has subsided.

3. The roof cover according to claim 1, wherein the mast and the associated floating element are stabilized in a horizontal plane by means of radially arranged upper support means stretched between the support ring and the upper part of the mast, and radially arranged lower support means stretched between the float ring and a lower part of the mast via an annular body through which the mast has vertical freedom of movement.

4. The roof cover according to claim 1, wherein the mast is elastically deformable when subjected to loading from external fluids.

5. The roof cover according to claim 1, wherein the sector segments are further divided into several tubular members.

6. The roof cover according to claim 1, wherein the roof cover comprises drainage channels arranged radially out from the center axis, wherein the drainage channels are aligned with the slits and joining means between the sector segments, and wherein the drainage channels are positioned on an underside of the roof cover.

7. The roof cover according to claim 1, wherein the mast is configured to yield to loads applied substantially along a longitudinal axis of the mast.

8. The roof cover according to claim 1, wherein light sources are mounted in a ceiling of the roof cover.

9. The roof cover according to claim 1, wherein the float ring has a circumference of approx. 200 m.

10. The roof cover according to claim 1, further comprising:
    an annular body encircling the mast and movable along a length of the mast; and
    a lower support means extending radially between and interconnecting the annular body and the float ring.

11. The roof cover according to claim 10, further comprising an upper support means attached to the upper part of the mast and extending radially between and interconnecting the upper part of the mast and the support ring.

12. The roof cover according to claim 1, wherein the floating element is configured to float on water while holding the solar cells upright and above the water.

13. The roof cover according to claim 1, wherein the opening is configured to allow air to flow between a location that is outside of and above the upper membrane and an internal space of the roof cover, the internal space of the roof cover being collectively defined by the lower membrane, the float ring, and a water surface when the roof cover is disposed on the water surface.

14. A roof cover for a fish farm, the fish farm comprising a float ring having a central axis and a net cage fixed to the float ring, wherein:
    the roof cover is attached to the float ring;
    the roof cover is supported by a mast arranged on a floating element located inside the float ring;
    the roof cover is divided into several sector segments circumferentially spaced about the central axis and separated radially from the center axis,
    the sector segments are coupled together such that open slits are defined between the sector segments,
    the roof cover comprises drainage channels extending outward from the central axis that are aligned with the slits and positioned along an underside of the roof cover,
    each sector segment has a double membrane comprising an upper and a lower membrane that are joined together along a periphery of the sector segment to form an inflatable air space between the membranes, and
    the roof cover further includes a support ring which provides an opening in the roof cover between the roof cover and an upper part of the mast that is configured to normalize air pressure below the roof cover relative to ambient pressure above the roof cover.

15. The roof cover according to claim 14, wherein the roof cover is adapted to yield or collapse due to external fluid loading and further adapted to automatically rise after the fluid loading has subsided.

16. The roof cover according to claim 14, further comprising:
    an annular body encircling the mast and movable along a length of the mast; and
    a lower support means extending radially between and interconnecting the annular body and the float ring.

17. The roof cover according to claim 16, further comprising an upper support means attached to the upper part of the mast and extending radially between and interconnecting the upper part of the mast and the support ring.

18. A roof cover for a fish farm, the fish farm comprising:
    a float ring having a central axis and a net cage fixed to the float ring, wherein:
    the roof cover is attached to the float ring;
    the roof cover is supported by a mast arranged on a floating element located inside the float ring;
    the roof cover is adapted to yield or collapse due to external fluid loading and further adapted to automatically rise after the fluid loading has subsided;
    the roof cover is divided into several sector segments circumferentially spaced about the central axis and separated radially from the center axis,
    the sector segments are coupled together such that open slits are defined between the sector segments,
    each sector segment has a double membrane comprising an upper and a lower membrane that are joined together along a periphery of the sector segment to form an inflatable air space between the membranes, and
    the roof cover further includes a support ring which provides an opening in the roof cover between the roof cover and an upper part of the mast that is configured to allow air flow therethrough to normalize air pressure below the roof cover relative to ambient pressure above the roof cover;
    an annular body encircling the mast and movable along a length of the mast;
    a lower support means extending radially between and interconnecting the annular body and the float ring; and
    an upper support means attached to the upper part of the mast and extending radially between and interconnecting the upper part of the mast and the support ring.

* * * * *